United States Patent
Bae et al.

(10) Patent No.: US 10,621,073 B2
(45) Date of Patent: Apr. 14, 2020

(54) METHOD AND APPARATUS FOR TESTING SOFTWARE BY USING STATIC ANALYSIS RESULTS AND COMPUTER READABLE RECORDING MEDIUM HAVING PROGRAM FOR PERFORMING THE SAME

(71) Applicant: SURESOFT TECHNOLOGIES INC., Seoul (KR)

(72) Inventors: Hyun Seop Bae, Seoul (KR); June Kim, Daejeon (KR); Seung-uk Oh, Seoul (KR); Min Hyuk Kwon, Gyeonggi-do (KR)

(73) Assignee: SURESOFT TECHNOLOGIES INC., Seoul (KR)

( * ) Notice: Subject to any disclaimer, the term of this patent is extended or adjusted under 35 U.S.C. 154(b) by 0 days.

(21) Appl. No.: 15/901,786

(22) Filed: Feb. 21, 2018

(65) Prior Publication Data
US 2019/0196942 A1   Jun. 27, 2019

(30) Foreign Application Priority Data
Dec. 26, 2017   (KR) .......................... 10-2017-0179950

(51) Int. Cl.
*G06F 11/36* (2006.01)
*G06F 8/75* (2018.01)

(52) U.S. Cl.
CPC ...... *G06F 11/3672* (2013.01); *G06F 11/3604* (2013.01); *G06F 8/75* (2013.01)

(58) Field of Classification Search
CPC ............. G06F 11/3688; G06F 11/3616; G06F 11/362; G06F 11/3664; G06F 11/3696; G06F 17/18
See application file for complete search history.

(56) References Cited

U.S. PATENT DOCUMENTS 6,895,577 B1 *  5/2005  Noble ................. G06F 11/3676
                                                        714/38.12
9,612,943 B2 *  4/2017  Boshernitsan ...... G06F 11/3688
(Continued)

FOREIGN PATENT DOCUMENTS

KR   10-2008-0068385 A   7/2008

OTHER PUBLICATIONS

Renee C. Bryce et al.; Developing a Single Model and Test Prioritization Strategies for Event-Driven Software; IEEE; pp. 48-64; retrieved on Nov. 13, 2019. (Year: 2011).*
(Continued)

*Primary Examiner* — S. Sough
*Assistant Examiner* — Cuong V Luu
(74) *Attorney, Agent, or Firm* — Fenwick & West LLP

(57) ABSTRACT

The present disclosure relates to a method and apparatus for testing software and a computer readable recording medium having a program for performing the same, and more particularly to a method for quickly testing software by using static analysis results and for quickly achieving a desired quality objective and a computer readable recording medium having a program for performing the same. The method for testing software in accordance with the embodiment of the present invention includes a step of statically analyzing a source code of software and extracting pieces of source code information; a step of extracting a unit-based code index from the extracted pieces of source code information; and a step of evaluating testing effort of each unit on the basis of the extracted unit-based code index.

13 Claims, 3 Drawing Sheets

(56) References Cited

U.S. PATENT DOCUMENTS

| | | | |
|---|---|---|---|
| 9,753,845 B1* | 9/2017 | van Schaik | G06F 11/3672 |
| 9,880,924 B2* | 1/2018 | Peck | G06F 11/3696 |
| 2008/0115114 A1 | 5/2008 | Palaparthi et al. | |
| 2011/0258602 A1 | 10/2011 | Ndem et al. | |
| 2015/0007140 A1* | 1/2015 | Boshernitsan | G06F 11/3688 |
| | | | 717/124 |
| 2016/0246709 A1* | 8/2016 | Peck | G06F 11/3696 |

OTHER PUBLICATIONS

Md. Innrul Kayes; Test Case Prioritization for Regression Testing Based on Fault Dependency; IEEE; pp. 48-52; retrieved on Nov. 13, 2019. (Year: 2011).*

Korean Intellectual Property Office, Notification of Reason for Refusal, KR Patent Application No. 10-2017-0179950, dated Jul. 12, 2019, seven pages.

* cited by examiner

Fig. 2

```
// FUNPA : 2
// FUNCE : 2
// FUMNC : 3
int testme1(int x, int y){
    if(x){
        if(y){
            func1();
        }
        else{
            if(x<y){
                func2();
            }
        }
    }
}

// FUNPA : 2
// FUNCE : 1
// FUMNC : 2
int testme2(int x, int y){
    if(x && y){
        if(x<y){
            func1();
        }
    }
}
```

```
int testme3(){
    int x = rand();
    int y = rand();
    if(x){
        if(y){
            func1();
        }
        else{
            if(x<y){
                func2();
            }
        }
    }
}
```

METHOD AND APPARATUS FOR TESTING SOFTWARE BY USING STATIC ANALYSIS RESULTS AND COMPUTER READABLE RECORDING MEDIUM HAVING PROGRAM FOR PERFORMING THE SAME

CROSS-REFERENCE TO RELATED APPLICATIONS

This application claims the benefit of Korean Patent Application No. 10-2017-0179950 filed on Dec. 26, 2017, which is hereby incorporated by reference in its entirety.

BACKGROUND

Field

The present disclosure relates to a method and apparatus for testing software and a computer readable recording medium having a program for performing the same, and more particularly to a method for quickly testing software by using static analysis results and for quickly achieving a desired quality objective and a computer readable recording medium having a program for performing the same.

Description of the Related Art

Recently, software (SW) available on computers or in an online manner only is loaded on various devices and thus provides convenience to our daily life and industrial fields. Therefore, there is increasing demand for correcting errors by sufficiently testing SW before the SW is released to markets. Particularly, occurrence of errors during the operation of vehicles, trains, and airplanes may cause damage of human life.

There are a variety of software analysis tools for testing SW. For example, there are representative software analysis tools such as a static analysis (or static program analysis) tool which analyzes SW source codes as they are and detects potential errors in the SW source codes, and a dynamic analysis (dynamic program analysis) tool which detects errors caused by actually executing the developed SW. There is also a code coverage measurement tool capable of measuring code coverage.

A unit test is one of the methods for testing software. The unit test is to regard each component of the software as a unit and to test operating characteristics of the unit. Here, in general, a function or a procedure is regarded as a unit or one file is regarded as a unit because the definition of the unit is ambiguous depending on the size of the software.

In the existing software testing tools which define a function as the unit and help the test, there are various concerns about which of the many units should be tested first in order to conduct the test with better quality. The most general method is to provide a user with only predetermined indices without a special recommendation and to cause the user to select for himself/herself. However, this general method is not efficient when there are many units and the relationship between them is complicated.

SUMMARY

One embodiment is a method for testing software. The method includes: a step of statically analyzing a source code of software and extracting pieces of source code information; a step of extracting a unit-based code index from the extracted pieces of source code information; and a step of evaluating testing effort of each unit on the basis of the extracted unit-based code index.

Another embodiment is a computer readable recording medium which is capable of recording a computer program for performing the above-described method.

Further another embodiment is an apparatus for testing software. The apparatus includes: a static analysis module which statically analyzes a source code of software and extracts pieces of source code information; a code index extraction module which extracts a unit-based code index from the pieces of source code information extracted by the static analysis module; and a scoring module which scores testing effort of each unit on the basis of the unit-based code index extracted by the code index extraction module.

BRIEF DESCRIPTION OF THE DRAWINGS

FIG. 2 shows examples (testme1, testme2) for describing function-based testing effort;

DETAILED DESCRIPTION

Figure 1:
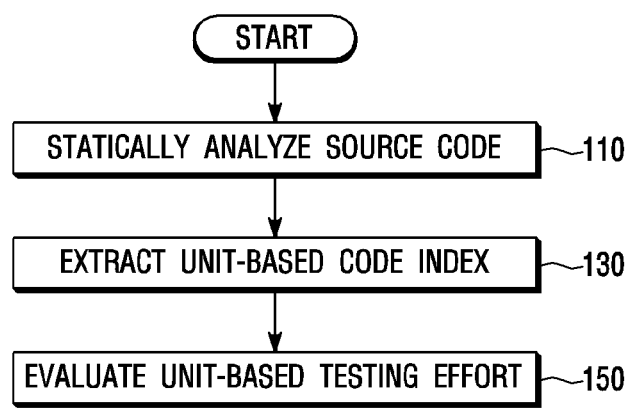
FIG. 1 is a flowchart for describing a method for testing software by using static analysis results in accordance with an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a method for testing software by using static analysis results in accordance with an embodiment of the present invention will be described with reference to the accompanying drawings.

FIG. 1 is a flowchart for describing the method for testing software by using static analysis results in accordance with an embodiment of the present invention.

Referring to FIG. 1, the method for testing software by using static analysis results in accordance with the embodiment of the present invention may include a step (110) of statically analyzing a source code of software which is a test target, a step (130) of extracting a unit-based code index, and a step (150) of evaluating unit-based testing effort.

The step (110) of statically analyzing a source code of software is to statically analyze the source code of the software, which is a test target. The static analysis is to skim through the source code without making the software actually executable. Through the static analysis, pieces of predetermined source code information are extracted from the source code.

The step (130) of extracting the unit-based code index is to extract the unit-based code index from the pieces of predetermined source code information extracted in the step (110). The extracted unit-based code index may follow the calculation method that various static analysis tools measuring the code index use.

The unit may be one of the functions, procedures, and files in accordance with the size of the software. Hereinafter, for convenience of description, it is assumed that the functions constitute the unit.

For example, the abbreviation of an extracted function-based code index may be given by using ( ) as shown in the following table 1 below.

TABLE 1

| Code Index | Description |
|---|---|
| (FUMNC) | Maximum Nesting Depth of Control Structure |
| (FUNPA) | Number of Parameters |
| (FUNCE) | Number of Callees |
| (FUNST) | Number of Statements - Number of all statements except block, empty statement, declaration, and label |
| (FUCYC) | Cyclomatic Complexity |
| (FUMCYC) | Modified Cyclomatic Complexity |
| (FUNCR) | Number of Callers |

After the unit-based code index is extracted in step (130), the testing effort of each unit is evaluated in the step (150) of evaluating the unit-based testing effort. Here, the unit-based testing effort may be evaluated by a score (or value) obtained by substituting the extracted unit-based code index into a predetermined testing effort formula. The example below shows that the functions constitute the unit.

For example, the predetermined testing effort formula may be represented by the following equation (1).

$$((FUNPA)*(FUNCE)*(FUMNC))+ \\ (((FUNPA+1)*\Sigma FUNPA)+FUNCE) \qquad \text{Equation (1)}$$

In equation (1), ($\Sigma$FUNPA) means a sum of (FUNPA) of all of the functions.

In equation (1), ((FUNPA)*(FUNCE)*(FUMNC)) considers a case where the number of parameters of the function is large, the number of callees in the function is large, and the assembly structure in the function is complex. The tester has to consider finding appropriate values for the parameters and stubbing depending functions. Therefore, it can be evaluated that the larger the value (or score) of the ((FUNPA)*(FUNCE)*(FUMNC)) is, the further the testing effort is required.

For example, in two examples (testme1, testme2) shown in FIG. 2, (FUNPA) of the testme1 is 2, (FUNCE) of the testme1 is 2, and (FUMNC) of the testme1 is 3. Meanwhile, (FUNPA) of the testme2 is 2, (FUNCE) of the testme1 is 1, and (FUMNC) of the testme1 is 2. ((FUNPA)*(FUNCE)*(FUMNC)) of the testme1 is 12, and ((FUNPA)*(FUNCE)*(FUMNC)) of the testme2 is 4. Therefore, the testme1 requires more testing effort than the testme2 does.

In equation (1), (FUNPA+1) considers that (FUNPA) is 0. That is, (FUNPA+1) functions as a guard for multiplication when (FUNPA) is 0.

Figures 3, 4:
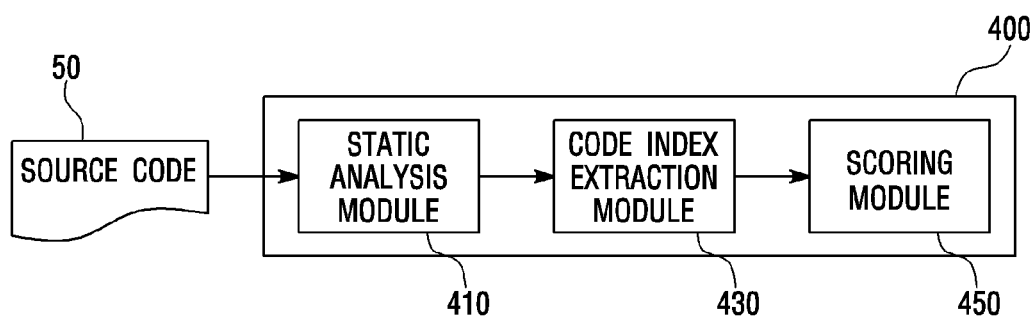
FIG. 3 shows an example (testme3) for describing the function-based testing effort.
FIG. 4 is a block diagram for describing an apparatus for testing software in accordance with the embodiment of the present invention.

For example, in the example shown in FIG. 3, (FUNPA) is 0. In this case, even when other values are large, the score of the testing effort formula in equation (1) becomes significantly smaller. Therefore, for the purpose of increasing the score of the testing effort formula in equation (1) to a certain degree, a predetermined value such as 1 is added to (FUNPA). Here, values other than 1 may be also added to (FUNPA).

In ((FUNPA+1)*$\Sigma$FUNPA)+FUNCE in equation (1), more testing effort is required between (FUNPA) and (FUNCE) when (FUNPA) is larger than (FUNCE).

In equation (1), ($\Sigma$FUNPA) is used as a weight. This value may be found through experiments on various source codes or may be predetermined.

In addition to equation (1), the testing effort formula required by the functions may be also replaced by the following equations (2) to (4).

$$((FUNPA+1)*(FUNC+1)*(FUMNC+1)) \qquad \text{Equation (2)}$$

$$((FUNPA+1)*(FUNC+1)) \qquad \text{Equation (3)}$$

The equation (3) can be used to determine the testing flexibility of the function. The testing flexibility of the function is advantageous when there are many variables or functions that can be used as an input parameter.

$$((FUNPA+1)w1(FUNCE+1)*w2+(FUMNC+1)*w3) \qquad \text{Equation (4)}$$

In equation (4), w1, w2, and w3 are predetermined weight values. They may all have the same value or may have different values.

A user can evaluate a function-based test ranking in conformity with his/her desired purpose by a method of combining the score (value) of the function-based testing effort obtained through equations (1) to (4) with a static metric or by a method of sorting the score (value) of the function-based testing effort.

Also, the use of the score (value) of the function-based testing effort obtained through equations (1) to (4) may be helpful to find a target function such as the following examples. Functions that require less testing effort, functions that minimize the effort required by other tests when the test is successful, frequently used functions, functions that do not need to conduct the test, functions that are easy to handle from the viewpoint of a unit test, functions that require less testing effort among the functions that are frequently and complexly used, functions with the highest coverage when conducting the test among the functions that are easy to handle from the viewpoint of the unit test can be taken as an example of the target function.

The foregoing description assumes that the functions constitute the unit. However, procedures or files may constitute the unit.

The method for testing software in accordance with the embodiment of the present invention uses static analysis results to reasonably select or determine the unit that should be tested first in the unit test, not by a user's subjective standard but by a numerical objective standard. As such, when the unit that should be tested first in the unit test is objectively and reasonably selected, a software quality objective can be quickly accomplished.

Further, the method for testing software in accordance with the embodiment of the present invention can help to improve the software that helps the unit test and can be helpful to the test productivity of a general user by showing which source code index should be used to rank the units.

The method for testing software in accordance with the embodiment of the present invention may be implemented in the form of a program instruction which is executable by various computer components and may be recorded in a non-transistory computer-readable recording medium. The computer-readable recording medium may include the program instruction, data file, data structure, etc., individually or in a combination thereof.

The program instruction which is recorded in the non-transitory computer readable recording medium may be specially designed and configured for the present invention or may be well-known and available to those skilled in the field of computer software.

A magnetic medium such as a hard disk, a floppy disk and a magnetic disk, an optical recording medium such as a CD-ROM and DVD, a magnetic-optical medium such as a floptical disk, and a hardware device such as ROM, RAM, a flash memory and the like, which is specially configured to store and run program instructions are included as examples of the non-transitory computer-readable recording medium. Not only a machine language code which is formed by a complier but also high-level language code which can be executed by a computer using an interpreter is included as examples of the program instruction. The hardware device may be configured to operate as one or more software modules in order to perform the processes according to the present invention, and vice versa.

FIG. 4 is a block diagram showing an apparatus for testing software in accordance with the embodiment of the present invention.

Referring to FIG. 4, an apparatus 400 for testing software in accordance with the embodiment of the present invention may include a static analysis module 410, a code index extraction module 430, and a scoring module 450.

The static analysis module 410 receives a source code 50 of the software which is a test target. The static analysis module 410 statically analyzes the received source code 50. The static analysis module 410 extracts pieces of predetermined source code information through the static analysis.

The code index extraction module 430 extracts the unit-based code index from the pieces of source code information analyzed by the static analysis module 410. The function-based code index extracted when the functions constitute the unit may be represented as shown in the above table 1.

The scoring module 450 scores the testing effort of each unit from the unit-based code index extracted by the code index extraction module 430. The testing effort score of each unit can be obtained by substituting the unit-based code index extracted by the code index extraction module 430 into a predetermined testing effort formula. Here, the predetermined testing effort formula may be one of the foregoing equations (1) to (4).

The apparatus 400 for testing software in accordance with the embodiment of the present invention uses pieces of information analyzed by the static analysis module to reasonably select or determine the unit that should be tested first in the unit test, not by a user's subjective standard but by a numerical objective standard. As such, when the unit that should be tested first in the unit test is objectively and reasonably selected, a software quality objective can be quickly accomplished.

Further, the apparatus for testing software in accordance with the embodiment of the present invention can help to improve the software that helps the unit test and can be helpful to the test productivity of a general user by showing which source code index should be used to rank the units.

The embodiments of the present invention may take the form of hardware as a whole, software (including firmware, resident software, microcode, etc.) as a whole or a computer program product implemented in at least one computer readable medium in which a computer readable program code is implemented.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A computer-implemented method for testing software, the method comprising:

statically analyzing source code of software without previously executing the source code and extracting a plurality of units from the source code based on the analysis, each of the plurality of units comprising one of a function, a procedure, or a file;

extracting a unit-based code index for each of the plurality of units extracted from the source code, each unit-based code index describing a plurality of attributes of a unit that is associated with the unit-based code index and values for each of the plurality of attributes, the value for each of the plurality of attributes indicative of a total number of instances of the attribute in the associated unit, wherein at least one unit-based code index is a function-based code index, and wherein the plurality of attributes comprise a maximum nesting depth of control structure (FUMNC), a number of parameters (FUNPA), a number of callees (FUNCE), a number of statements (FUNST), a cyclomatic complexity (FUCYC), a modified cyclomatic complexity (FUMCYC), and number of callers (FUNCR);

calculating a testing effort of each of the plurality of units based on the values for each of the plurality of attributes for the unit that are included in the unit-based code index of the unit, the calculated testing effort for each of the plurality of units are collectively indicative of a recommended testing order for the plurality of units wherein calculating the testing effort comprises calculating a first score for each of the plurality of units using the values of the unit-based code index for the unit in the following equation: $((FUNPA)*(FUNCE)*(FUMNC))+(((FUNPA+1)*\Sigma FUNPA)+FUNCE)$; and testing the plurality of units according to the recommended testing order.

2. The computer-implemented method of claim 1, wherein calculating the testing effort further comprises calculating a second score for each of the plurality of units using the values of the unit-based code index for the unit in the following equation:

$$((FUNPA+1)*(FUNCE+1)*(FUMNC+1)).$$

3. The computer-implemented method of claim 1, wherein calculating the testing effort further comprises calculating a third score for each of the plurality of units using the values of the unit-based code index for the unit in the following equation:

$$((FUNPA+1)*(FUNCE+1)).$$

4. The computer-implemented method of claim 1, wherein calculating the testing effort further comprises calculating a fourth score for each of the plurality of units using the values of the unit-based code index for the unit in the following equation:

$$((FUNPA+1)*w1+(FUNCE+1)*w2+(FUMNC+1)*w3),$$

where w1, w2, and w3 are predetermined weight values.

5. The computer-implemented method of claim 1, wherein providing the testing effort comprises:
ranking the plurality of units based on the calculated testing effort of each of the plurality of units.

6. A non-transitory computer readable recording medium storing executable code for testing software, the code when executed causes a computer to perform steps comprising:
statically analyzing source code of software without previously executing the source code and extracting a plurality of units from the source code based on the analysis, each of the plurality of units comprising one of a function, a procedure, or a file;
extracting a unit-based code index for each of the plurality of units extracted from the source code, each unit-based code index describing a plurality of attributes of a unit that is associated with the unit-based code index and values for each of the plurality of attributes, the value for each of the plurality of attributes indicative of a total number of instances of the attribute in the associated unit, wherein at least one unit-based code index is a function-based code index, and wherein the plurality of attributes comprise a maximum nesting depth of control structure (FUMNC), a number of parameters (FUNPA), a number of callees (FUNCE), a number of statements (FUNST), a cyclomatic complexity (FUCYC), a modified cyclomatic complexity (FUMCYC), and number of callers (FUNCR);
calculating a testing effort of each of the plurality of units based on the values for each of the plurality of attributes for the unit that are included in the unit-based code index of the unit, the calculated testing effort for each of the plurality of units are collectively indicative of a recommended testing order for the plurality of units wherein calculating the testing effort comprises calculating a first score for each of the plurality of units using the values of the unit-based code index for the unit in the following equation: ((FUNPA)*(FUNCE)*(FUMNC))+(((FUNPA+1)*ΣFUNPA)+FUNCE); and
testing the plurality of units according to the recommended testing order.

7. The non-transitory computer readable recording medium of claim 6, wherein calculating the testing effort further comprises calculating a second score for each of the plurality of units using the values of the unit-based code index for the unit in the following equation:

$$((FUNPA+1)*(FUNCE+1)*(FUMNC+1)).$$

8. The non-transitory computer readable recording medium of claim 6, wherein calculating the testing effort comprises calculating a third score for each of the plurality of units using the values of the unit-based code index for the unit in the following equation:

$$((FUNPA+1)*(FUNCE+1)).$$

9. The non-transitory computer readable recording medium of claim 6, wherein calculating the testing effort further comprises calculating a fourth score for each of the plurality of units using the values of the unit-based code index for the unit in the following equation:

$$((FUNPA+1)*w1+(FUNCE+1)*w2+(FUMNC+1)*w3),$$

where w1, w2, and w3 are predetermined weight values.

10. An apparatus for testing software, the apparatus comprising:
a computer processor; and
a non-transitory computer readable recording medium storing executable code, the code when executed by the computer processor causes the computer processor to perform steps comprising:
statically analyzing source code of software without previously executing the source code and extracting a plurality of units from the source code based on the analysis, each of the plurality of units comprising one of a function, a procedure, or a file;
extracting a unit-based code index for each of the plurality of units extracted from the source code, each unit-based code index describing a plurality of attributes of a unit that is associated with the unit-based code index and values for each of the plurality of attributes, the value for each of the plurality of attributes indicative of a total number of instances of the attribute in the associated unit, wherein at least one unit-based code index is a function-based code index, and wherein the plurality of attributes comprise a maximum nesting depth of control structure (FUMNC), a number of parameters (FUNPA), a number of callees (FUNCE), a number of statements (FUNST), a cyclomatic complexity (FUCYC), a modified cyclomatic complexity (FUMCYC), and number of callers (FUNCR);
calculating a testing effort of each of the plurality of units based on the values for each of the plurality of attributes for the unit that are included in the unit-based code index of the unit, the calculated testing effort for each of the plurality of units are collectively indicative of a recommended testing order for the plurality of units, wherein calculating the testing effort comprises calculating a first score for each of the plurality of units using the values of the unit-based code index for the unit in the following equation: ((FUNPA)*(FUNCE)*(FUMNC))+(((FUNPA+1)*ΣFUNPA)+FUNCE); and
testing the plurality of units according to the recommended testing order.

11. The apparatus of claim 10, wherein calculating the testing effort further comprises calculating a second score for each of the plurality of units using the values of the unit-based code index for the unit in the following equation:

$$((FUNPA+1)*(FUNCE+1)*(FUMNC+1)).$$

12. The apparatus of claim 10, wherein calculating the testing effort further comprises calculating a third score for each of the plurality of units using the values of the unit-based code index for the unit in o the following equation:

$$((FUNPA+1)*(FUNCE+1)).$$

13. The apparatus of claim 10, wherein calculating the testing effort further comprises calculating a fourth score for each of the plurality of units using the values of the unit-based code index for the unit in the following equation:

$$((FUNPA+1)*w1+(FUNCE+1)*w2+(FUMNC+1)*w3),$$

where w1, w2, and w3 are predetermined weight values.

* * * * *